(12) United States Patent
Bedrosian (10) Patent No.: US 8,094,686 B2
(45) Date of Patent: Jan. 10, 2012

(54) METHOD AND APPARATUS FOR SIMULATING PACKET DELAY VARIATION OF A MULTI-SWITCH NETWORK

(75) Inventor: Paul Stephan Bedrosian, Andover, MA (US)

(73) Assignee: Agere Systems, Inc., Allentown, PA (US)

( * ) Notice: Subject to any disclaimer, the term of this patent is extended or adjusted under 35 U.S.C. 154(b) by 931 days.

(21) Appl. No.: 12/082,348

(22) Filed: Apr. 10, 2008

(65) Prior Publication Data

US 2009/0259445 A1 Oct. 15, 2009

(51) Int. Cl.
*H04J 3/06* (2006.01)
*H04J 3/00* (2006.01)
*G06F 7/60* (2006.01)
*G06F 17/10* (2006.01)
*G06G 7/62* (2006.01)

(52) U.S. Cl. ............... 370/503; 370/521; 703/2; 703/17
(58) Field of Classification Search .................. None
See application file for complete search history.

(56) References Cited

U.S. PATENT DOCUMENTS

| | | | | |
|---|---|---|---|---|
| 4,817,085 | A * | 3/1989 | De Prycker | 370/252 |
| 5,570,346 | A * | 10/1996 | Shur | 370/231 |
| 5,812,530 | A * | 9/1998 | Fernandez et al. | 370/250 |
| 7,778,167 | B2 * | 8/2010 | Bedrosian | 370/229 |
| 2003/0099243 | A1 * | 5/2003 | Oh et al. | 370/395.21 |
| 2004/0167756 | A1 * | 8/2004 | Yonezawa | 703/2 |
| 2008/0137691 | A1 * | 6/2008 | Barry et al. | 370/503 |
| 2008/0225747 | A1 * | 9/2008 | Bedrosian | 370/252 |

OTHER PUBLICATIONS

"Timing and Synchronization Aspects in Packet Networks", ITU-T Recommendation G.8261/Y.1361 (May 2006).
"Ethernet Network Emulators: GEM,XGEM", High Performance Precision Emulators, Anue Systems, Inc. (Nov. 2007).
S. Kaczmarek, et al., "Methods for Evaluation Packet Delay Distribution of Flows Using Expedited Forwarding PHB", Journal of Telecomm. & Information Technology (Feb. 2004).

* cited by examiner

Primary Examiner — Xavier Szewai Wong (57) ABSTRACT

A packet delay variation simulation system has a packet generator, a packet delay variation generator, and a packet delay analyzer to analyze delayed packets. The packet delay variation generator has multiple delay distribution modules that use both a deterministic delay process and a statistical delay process packet for determining a packet's delay. The packet delay variation generator may utilize different probability density functions to describe various portions of measured packet data. That is, measured packet delay information is analyzed and information from this analysis is used to construct a total delay model for a network. The delay may include a pre-determined deterministic delay offset as well as one or more variable statistical delay offsets.

18 Claims, 10 Drawing Sheets

| | MEASUREMENT | SIMULATED PDF | ERROR |
|---|---|---|---|
| DELAY $\mu$ | 26.9586 $\mu$s | 26.66 $\mu$s | -1.11% |
| DELAY $\sigma$ | 73.20 ns | 73.06 ns | -.19% |
| p-p DELAY | 620.4 ns | 646.10 ns | 4.19% |

PDF SIMULATION: GAMMA PDF ($\alpha$=186.628, $\beta$=0.00536)
GAMMA % = 100%
GAMMA STEP SIZE = ± 1.0 $\mu$s VARIABLE

FIG. 11

BINS=100      MEASUREMENTS=47414      28 $\mu$sec

|  | MEASUREMENT | SIMULATED PDF | ERROR |
|---|---|---|---|
| DELAY $\mu$ | 26.9462 $\mu$s | 26.94 $\mu$s | -0.02% |
| DELAY $\sigma$ | 79.12 ns | 81.90 ns | 3.51% |
| p-p DELAY | 1.209 $\mu$s | 1.2157 ns | 0.55% |
| PDF SIMULATION: GAMMA PDF ($\alpha$=187.628, $\beta$=0.00536) <br> UNIFORM PDF: $D_{MIN}$ = 27.098$\mu$s  $D_{MAX}$ = 27.88$\mu$s <br> GAMMA % = 99.5% <br> UNIFORM % = 0.5% <br> GAMMA STEP SIZE = ± 1.0 $\mu$s VARIABLE ||||

| | MEASUREMENT | SIMULATED PDF | ERROR |
|---|---|---|---|
| DELAY $\mu$ | 28.9450 $\mu s$ | 28.84 $\mu s$ | −0.36% |
| DELAY $\sigma$ | 7.008 $\mu s$ | 6.998 $\mu s$ | −0.14% |
| p-p DELAY | 34.77 $\mu s$ | 34.67 $\mu s$ | −0.08% |

PDF SIMULATION: GAMMA PDF ($\alpha$=156.25, $\beta$=0.0064)
UNIFORM-1 PDF: $D_{MIN}$ = 26.86$\mu s$   $D_{MAX}$ = 43$\mu s$
UNIFORM-2 PDF: $D_{MIN}$ > 43$\mu s$   $D_{MAX}$ = 61.2$\mu s$
GAMMA % = 90.7%
UNIFORM-1 % = 0.8%
UNIFORM-2 % = 8.5%
GAMMA STEP SIZE = ± 1.0 $\mu s$ VARIABLE

METHOD AND APPARATUS FOR SIMULATING PACKET DELAY VARIATION OF A MULTI-SWITCH NETWORK

CROSS REFERENCE TO RELATED APPLICATIONS

This application is related to co-pending U.S. patent application Ser. No. 12/074,154, entitled "Simulating Packet Delay Variation Using Step-Target Delay Method," filed Feb. 29, 2008, co-pending U.S. patent application Ser. No. 12/074,031, entitled "Method and System for Generating Packet Delay Variation with a Uniform Distribution," filed Feb. 29, 2008, U.S. patent application Ser. No. 12/074,155, entitled "Connectionless Configurations for Stress Testing Timing and Synchronization in Data Packet Networks," filed Feb. 29, 2008, and U.S. patent application Ser. No. 12/074,043, entitled "Derivative Packet Delay Variation as a Metric for Packet Timing Recovery Stress Testing," filed Feb. 29, 2008, each of which incorporated herein by reference.

BACKGROUND OF THE INVENTION

In multi-switch networks, packets (e.g., blocks of data) are routed between switches over data links shared with other traffic. In each network switch, packets are queued or buffered, resulting in variable delay. Packet delays and delay variations are caused by the queuing and scheduling processes of packets through intermediate packet switches. Much of this variation is the result of sharing a switch's queues and scheduling resources by multiple traffic flows. Though this sharing provides resource efficiency (e.g., low packet delays) for the majority of the packets, it often results in significantly longer packet delays during times of high traffic bursts and/or when large packets pass through the switches.

Figure 1:
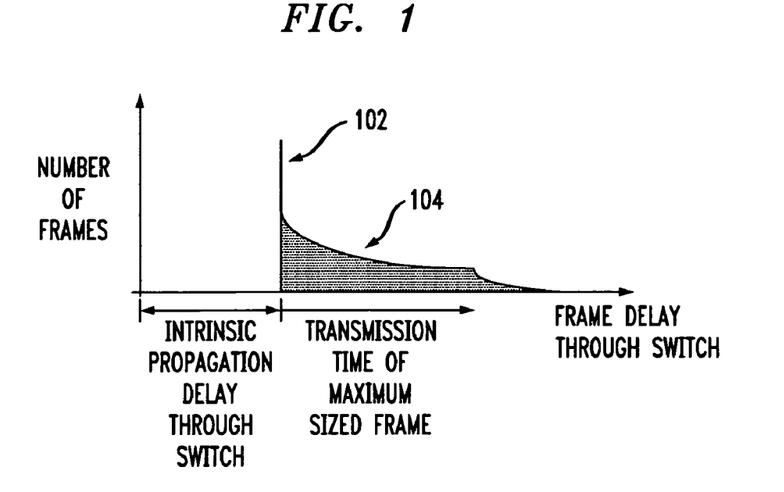
FIG. 1 is an exemplary histogram of PDV caused by packet propagation in a packet network.

FIG. 1 is an illustration of packet delay variation (PDV) caused by packet propagation in a packet network. As shown, there is a narrow band of low delay packets 102. This band typically has the highest occurrence of packets with the lowest delay and delay variation. Thus, packets in this low delay band are best suited for use by adaptive timing recovery algorithms. The other packets in the distribution comprise the "long-tail" 104. These packets typically have larger delays and higher delay variation. This portion of the distribution will tend to increase (e.g., in delay and delay variation) as packets experience higher levels of queuing delay. This delay may be caused by a single switch or may be the result of multiple cascaded switches. As packets in the long-tail portion 104 of the distribution increase, packets in the low-delay band 102 will decrease (e.g., as a percentage of the total population).

Though PDV is generally modeled as having a Gaussian probability density function (PDF), this modeling may be inappropriate for stress-testing adaptive timing recovery algorithms. This is due to the fact that Gaussian PDFs tend to have the majority of values within one standard deviation of the mean. Thus, few of the values (e.g., less than 5%) at the extreme of the distribution are tested over a given time interval. For stress testing, all values of the range of interest, including the extreme values, need to be tested appropriately.

Figure 2:
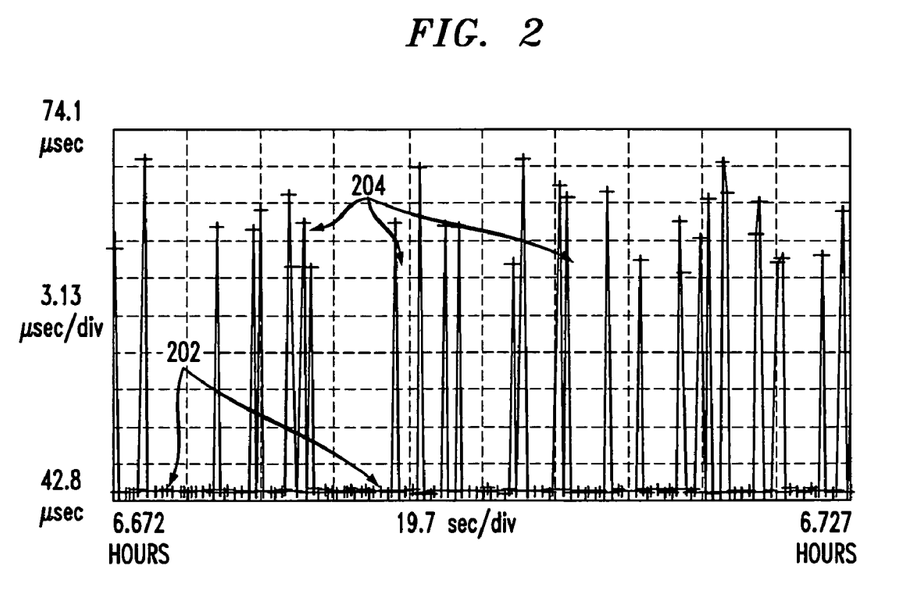
FIG. 2 depicts how the packet delays of an exemplary packet stream of interest fluctuates when traversing multiple switches with moderate background traffic.

FIG. 2 is an exemplary plot of packet delays over time. In this way, FIG. 2 depicts how the delays of an exemplary packet stream of interest fluctuate when traversing multiple switches with moderate background packet traffic. In this example, there are two distinct packet delay bands—a low packet-delay band 202 and a high packet-delay band 204. The low packet-delay band 202 tends to have much lower variation (e.g., PDV) than the high packet delay-band 204.

The span and offset of the high packet-delay band 204 tends to be proportional to the amount of background packet traffic. Typically the greater the background packet traffic, the larger the band. As shown, the packets in the high packet-delay band 204 tend to occur in random bursts. In some cases, the number of packets in the high packet-delay band 204 can exceed those in the low packet-delay band.

Further, the packet-to-packet delay variation in the low packet-delay band 202 is significantly smaller than that in the high packet-delay band 204. The high packet-delay packets generally are substantially instantaneous jumps from and back to the low-packet delay band 202. Therefore, the packet-to-packet delay variations in each of these delay bands should be treated differently.

Understanding the nature of PDV caused by network devices, network equipment configurations, and live operating networks is important for designing PDV cancellation algorithms. Network emulators (e.g., PDV generators, etc.) used to create PDV on an existing packet stream are typically used in a laboratory environment to simulate delays and delay variations experienced by packets in large networks. However, these network emulators simply assume that the PDV will follow Gaussian probability density function determined by a fixed mean and fixed standard deviation. However, these network emulators do not take into account how packet delays change with varying traffic load. That is, they do not address the true delay variation of packets in networks, which tends to follow a long-tailed probability density function for packet flowing over the same path.

Accordingly, a more comprehensive approach for modeling PDV in multi-switch networks is required.

BRIEF SUMMARY OF THE INVENTION

The present invention provides methods and apparatus for simulating packet delay variation in a multi-switch network. In at least one embodiment, a packet delay variation simulation system has a packet generator, a packet delay variation generator, and a packet delay analyzer to analyze delayed packets. The packet delay variation generator has multiple delay distribution modules that use both a deterministic delay process and a statistical delay process packet for determining a packet's delay. This capability supports the generation of both time variant and time invariant PDV.

The packet delay variation generator may utilize different probability density functions to describe various portions of measured packet data. That is, measured packet delay information is analyzed and information from this analysis is used to construct a total delay model for a network. The delay may include a pre-determined deterministic delay offset as well as one or more variable statistical delay offsets.

In some cases, the packet delay variation generator uses a Gamma distribution to describe the low delay portion of measured packet data and one or more uniform distributions to describe the long-tail portion of the measured packet data. In this way, the simulation system more accurately models and/or simulates the real network traffic.

These and other advantages of the invention will be apparent to those of ordinary skill in the art by reference to the following detailed description and the accompanying drawings.

DETAILED DESCRIPTION

The present invention relates generally to modeling packet delay variation (PDV) over multi-switched networks and more specifically to modeling PDV using a combination of deterministic and statistical delay processes.

Generally, a packet delay-step process for each packet delay band (e.g., similar to the low packet-delay band 202 and a high packet-delay band 204 described above) may be controlled by different statistical models. For example, by using a narrow-width Gamma probability density function (PDF) to model PDV in the low-delay band, the statistical delay variation may be precisely limited to this defined range. Likewise, by using a wide-width uniform PDF to model the high delay band (e.g., the "long-tail") PDV, the packet delays may be allowed to vary over a much wider delay range per the defined limits of this PDF.

Figure 3:
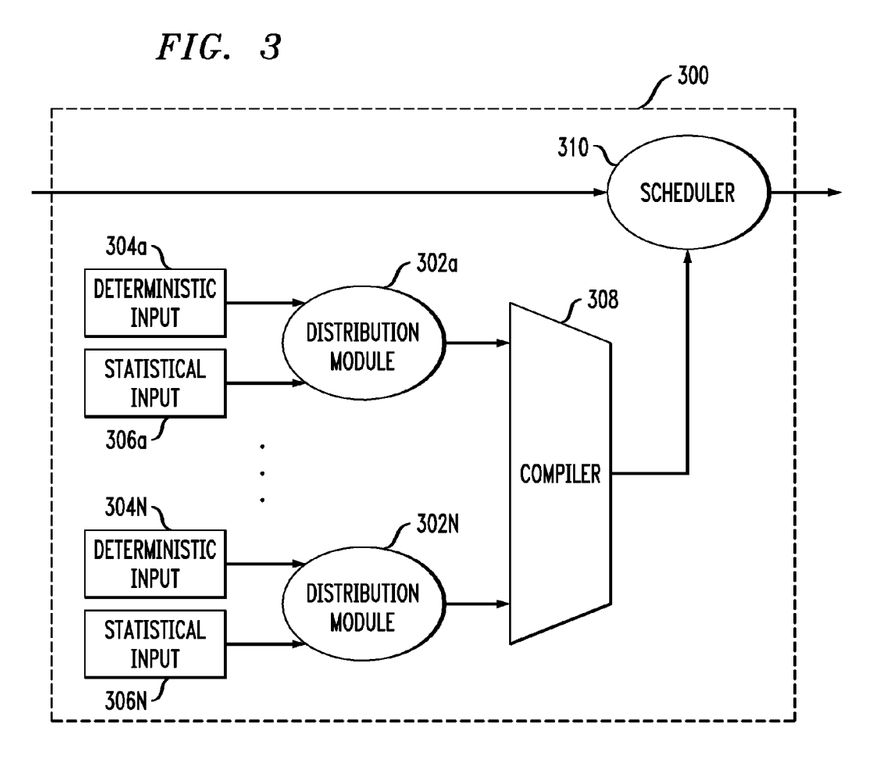
FIG. 3 depicts a PDV generator according to an embodiment of the present invention.

FIG. 3 depicts a PDV generator 300 according to an embodiment of the present invention. The PDV generator 300 may be used in the generation (e.g., modeling, etc.) of PDVs for packet propagation in a packet network with multiple delay bands as will be described in further detail below.

PDV generator 300 comprises one or more packet delay distribution modules 302a to 302N that are configured to determine a packet delay distribution for a packet. Each of the packet delay distribution modules 302a-N may receive a deterministic delay process packet delay variation input 304a-N and a statistical delay process packet delay variation input 306a-N. Such inputs may be in the form of algorithms, known quantities, probability density functions, user selected values, or any other appropriate method of setting the deterministic delay process packet delay variation input 304a-N and the statistical delay process packet delay variation input 306a-N.

PDV generator 300 further comprises a packet delay distribution compiler 308 configured to determine a total packet delay variation based on the packet delay distributions determined at the one or more packet delay distribution modules 302a-N and a packet delay scheduler 310 configured to receive the total packet delay variation from the packet delay distribution compiler 308 and packet information from another source and determine a probability density function profile of the packets.

The following shorthand is used herein below: $PTI(t)=$ Packet traffic of interest (e.g., the packet arrival time); $PDV_D(t)=$PDV based on deterministic delay process; $PDV_S(t)=$PDV based on statistical delay process; and $PDV_T(t)=$Total PDV based on combined delay processes. Both the statistical and deterministic processes may change over time to produce time variant PDV.

Packet traffic of interest (PTI) (e.g., a number of packets) may enter the PDV generator 300 with a set of timing characteristics based on the arrival time. PDV generator 300 may then add a delay component to a packet arrival time based on the internal PDV generation process discussed below. The packet with the new time delay may then be sent from the PDV generator 300. A series of these delayed packets based on the PDV generation process results in the overall packet delay variation of the PTI.

Thus, the PDV generation process may be based on both the deterministic $PDV_D(t)$ and statistical $PDV_S(t)$. These two independent delay processes may be computed on a packet-by-packet basis and applied to the specific arrival time of each packet. As such, the result of a particular PDV sequence is dependent upon the arrival time and arrival interval of the PTI. Therefore, multiple pairs of these deterministic and statistical processes may be used to create a variety of specific PDF profiles.

FIG. 3 also shows how both time variant and time invariant PDV can be generated from one or more PDV inputs. For example, time invariant PDV can be generated by applying one or more statistical distributions (e.g., Gaussian, Gamma) from packet delay variation input 304a-N to packet delay distribution modules 302a-N. Over time, the resulting PDV histogram at the output of packet delay scheduler 310 would represent a mathematically stationary process. Such a process would typically have a delay floor (minimum packet delay variations) that would tend to not change over increasing observation intervals.

Time variant PDV, for example, could be generated by applying one or more statistical distributions and/or one or more deterministic distributions (e.g., steep phase change, ramp phase change) that change over time. Over time, the resulting PDV histogram of this time variant process at the output of packet delay scheduler 310 would result in a mathematically non-stationary process. Such a process would typically have a delay floor that would tend to change over different observation intervals. Of particular interest is time variant PDV because it modulates the delay floor. In essence, the modulation of the delay floor will cause many adaptive timing recovery algorithms that rely on a stable delay floor to be stressed. Further, the application of background traffic alone will not always cause the delay floor to change in a predictable way. Therefore, the ability to modulate the delay floor directly provides a new and valuable way to evaluate adaptive timing recovery algorithms.

Figure 4:
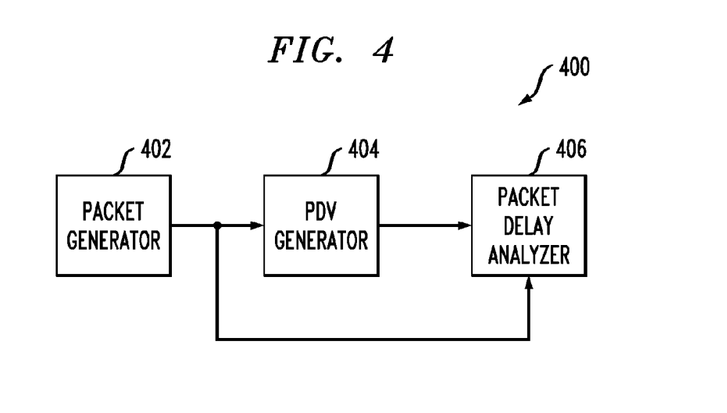
FIG. 4 depicts a PDV simulation system according to one embodiment of the present invention.

FIG. 4 depicts a PDV simulation system 400 according to one embodiment of the present invention. PDV simulation system 400 includes a packet generator 402, a PDV generator 404, and a packet delay analyzer 406.

PDV simulation system 400 may be implemented on a computer (e.g., computer 1800 of FIG. 18) using software such as database and/or spreadsheet software (e.g., Microsoft Excel, Access, etc.) and generates a user-defined delay profile to packets occurring at regular (e.g., periodic) intervals. Of course, such a simulator may generate signals indicative of packets in a live network. That is, while discussed herein as packets in a multi-switch network, it may be understood that any appropriate method for describing, modeling, and/or simulating packets and/or delaying packets (e.g., data input to an algorithm) may be used without incorporation of a physical network. Accordingly, signals may be any data or quantity that represents a packet and/or has the characteristics of a packet in a modeling and/or simulation environment and may be implemented in software, databases, hard-wired circuitry, logic, and/or integrated circuits. For example, a signal may be a message that indicates the packet's sent time, received time, total delay, and/or other information associated with a packet sent in a live network.

Packet generator 402 may be any system and/or module capable of generating a packet stream and/or a simulated packet stream. The generated packets may be generated at regular (e.g., periodic) intervals and each packet may be marked (e.g., time-stamped) with a sent time ($T_s$) of the packet.

PDV generator 404 may be similar to the PDV generator 300, as described above with respect to FIG. 3. PDV generator 404 may receive packets from packet generator 402 and apply a statistical and/or a deterministic delay to each packet and/or groups of packets. Accordingly, PDV generator 404 may independently control the delay and delay of variation of each packet.

In some embodiments, delay variation may be modeled as a probability density function (PDF). In some embodiments, the PDF may be a uniformly distributed PDF. In other embodiments, the PDF may be a Gamma distribution. In still other embodiments, as will be discussed below in further detail, the PDF may be a combination of a plurality of PDFs (e.g., Gamma and uniform, normal and uniform, etc.). In this way, the PDF may have user selectable parameters such as minimum PDV and maximum PDV, minimum delay step size and maximum delay step size, etc. In PDV generator 404, delay step size may be either fixed or variable.

Packet delay analyzer 406 may similarly be implemented to receive packets that have been delayed at the PDV generator 404 and generate analysis of the packet delays, etc. In some embodiments, as shown in FIG. 4, packets that mirror the packets sent to PDV generator 404 may be sent directly to packet delay analyzer 406 from packet generator 402. In the same or other embodiments, information about packets (e.g., $T_s$) may be sent to packet delay analyzer 406 from packet generator 402.

Packets received at packet delay analyzer 406 from the PDV generator 404 may be stamped with a receive time ($T_r$). Thus, the total packet delay of an individual packet (e.g., $T_r - T_s$) may be determined at packet delay analyzer 406. The delay variation of the packets (e.g., the delays of the individual packets) may be plotted as a histogram, output to another system or interface, and/or otherwise made available to a user.

Figure 5:
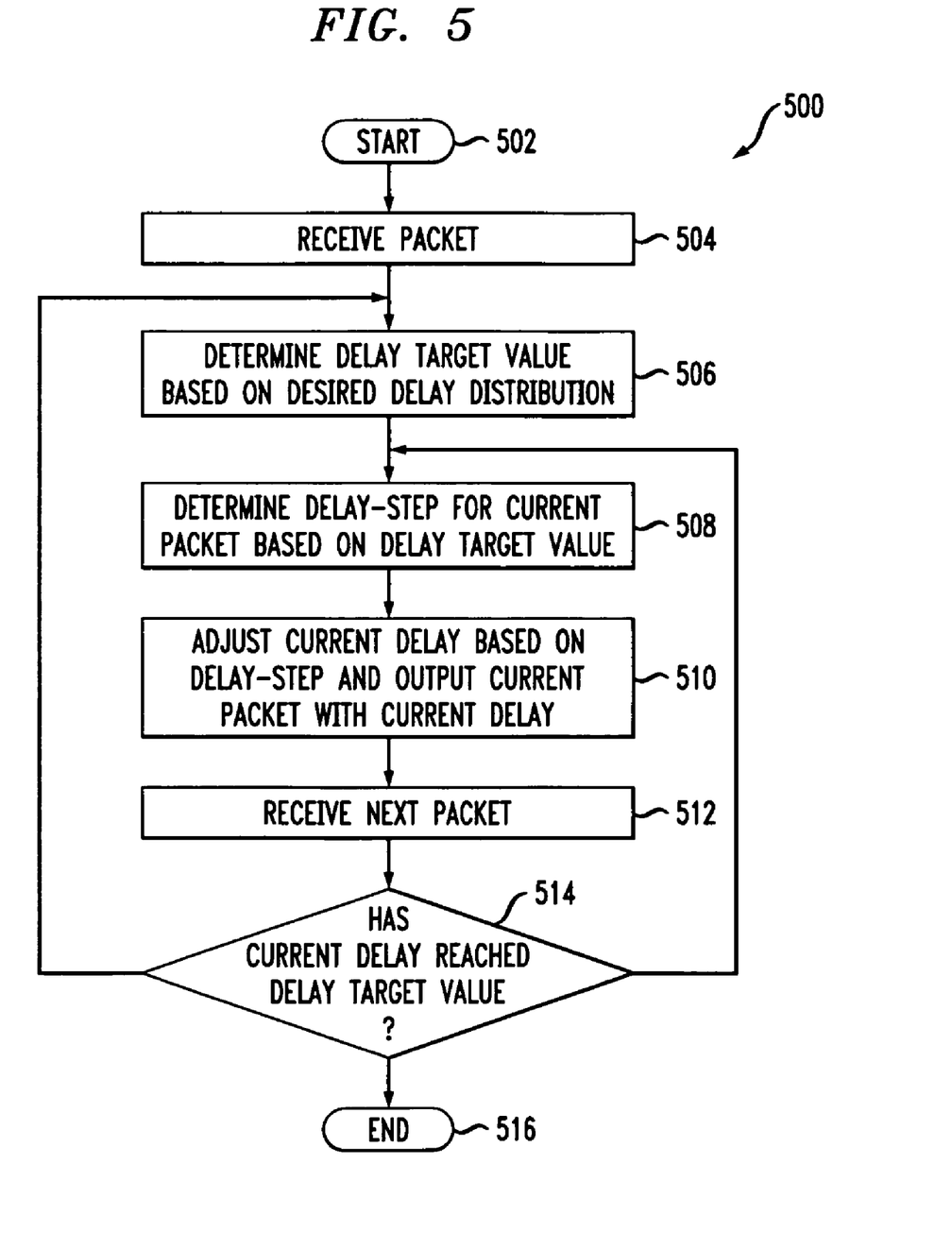
FIG. 5 depicts a flowchart of a method of modeling packet delay variation in multi-switch networks.

FIG. 5 depicts a flowchart of a method 500 of simulating packet delay variation in multi-switch networks according to an embodiment of the present invention. The method starts at step 502. Reference is made to various structures of FIGS. 3 and 4, though it may be understood that any appropriate implementation of the method steps described herein may be used.

In step 504, a packet is received at the input of the PDV generator, such as PDV generator 300 or PDV generator 404 above. The packet may be generated by a packet generator 402 and may have an associated packet sent time $T_s$.

In step 506, a delay target value is determined per the desired delay distribution. The desired delay distribution can be composed of one or more simple PDFs. In addition to one or more PDFs, the delay distribution may also consist of a delay offset ($D_{Off}$) where a fixed delay is applied to a group of packets (e.g., a specific portion of the received packets) at PDV generator 300/404. The delay offset can represent the propagation time experienced by packets as they travel between packet switches in a network. In some embodiments, a user may select (e.g., determine) $D_{Off}$ and enter the offset into PDV generator 300/404. In at least one embodiment, the delay offset is applied to packets in deterministic delay process packet delay variation inputs 304a-N.

As discussed above, the delay profile of a large sample of packets sent over a multi-switch network may be composed of one or more PDFs (e.g., a low delay PDF and a high delay PDF of the "long-tail"). Accordingly, each of these statistical delay distributions (e.g., PDFs) is applied to a random portion of the received packets. This distribution may also be a simple distribution of one or more packets and/or of a portion of input data. The distribution to be used may also be predetermined (e.g., by a user) using any appropriate method. In at least one embodiment, the distribution may be input and/or be available at one or more of the statistical delay process packet delay variation inputs 306a-N. Exemplary distributions are discussed below in more detail with reference to FIGS. 8-17.

The total delay for a packet may be determined as a combination of different delay components. That is, the sum total of delay from the deterministic delay (e.g., $D_{Off}$) and the statistical delay and may be expressed as: $D_{total}(t) = D_{Off} + D_p(t)$ where $D_p(t)$ is a packet delay due to random PDF, $D_{Off}$ is a fixed (e.g., deterministic) packet delay, and $D_{total}(t)$ is the total delay experienced by a packet.

The delays of each portion of received packets may be modeled with a particular PDF that can change over time. For example, in the case of input data (e.g., measured data related to packets in a multi-switch network) experiencing no background traffic, the input data may be modeled with just a Gamma distribution. That is, there may be no second portion. See, for example, FIGS. 8-9. Similarly, in the case of input data experiencing a small amount (e.g., approximately 5%) background traffic, the input data may be modeled using two distributions—a Gamma distribution for the first portion of the data and a uniform distribution for the "long-tail" second portion. See, for example, FIGS. 11-13.

In step 508, a delay-step is determined for the current packet based on the delay target value. The delay-step is an adjustment to a current delay value in order to change the current delay value in a direction towards the delay target value. According to various possible implementations, the delay-step can be calculated using a variable step size or a fixed step size.

According to the variable delay-step size implementation, the delay-step is calculated as a random uniformly distributed value between minimum and maximum step sizes, $D_{stepMIN}$ and $D_{stepMAX}$, respectively, where $D_{stepMIN}$ is negative and $D_{stepMAX}$ is positive. If the difference between the current delay and the delay target value is negative (e.g., the delay target value is larger than the current delay), then the step size value is between 0 and $D_{stepMAX}$. Otherwise (e.g., if the delay target value is less than the current delay), the step size value is between $D_{stepMIN}$ and 0. The step size may be restricted from being larger (in either positive or negative directions) than a step size that will adjust the current delay to match the target delay.

According to the fixed delay-step size implementation, the delay-step is determined to be equal to either $D_{stepMIN}$ or $D_{stepMAX}$. If the difference between the current delay and the delay target value is negative (e.g., the delay target value is larger than the current delay), then the step size value is $D_{stepMAX}$. Otherwise (e.g., if the delay target value is less than the current delay), the step size value is $D_{stepMIN}$. In this implementation, when the fixed step size would overshoot the delay target value, then the step size required to adjust the current delay to match the delay target value is used instead of $D_{stepMIN}$ or $D_{stepMAX}$.

Figure 6:
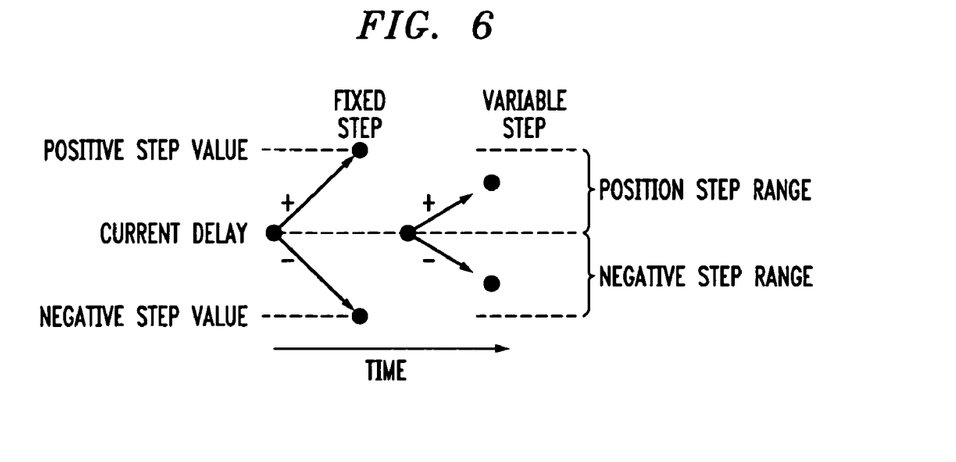
FIG. 6 depicts fixed and variable delay steps.

FIG. 6 illustrates delay-steps calculated using fixed and variable delay-step sizes. As illustrated in FIG. 6, for fixed delay-steps, a step-size of either a fixed positive step value ($D_{stepMAX}$) or a fixed negative value ($D_{stepMIN}$) is used to adjust the current delay, whereas for variable delay-steps, a step within a positive step range (between 0 and $D_{stepMAX}$) or within a negative step range (between $D_{stepMIN}$ and 0) is used to adjust the current delay.

Returning to FIG. 5, at step 510, the current delay is adjusted by the delay-step, and the current packet is output (e.g., transmitted, etc.) with the current delay from the PDV generator 404 to the packet receiver 406.

At step 512, the next packet is received at the PDV generator 404 from the packet generator 402. As described above, the packet generator 402 generates the packets at regular intervals.

At step 514, it is determined whether the current delay has reached the delay target value. If the current delay has not reached the delay target value, the delay target value is maintained and the method returns to step 508 to determine a delay-step for the current packet based on the delay target value. If the current delay has reached the delay target value, the method returns to step 506 to determine a new random delay target value based on the PDF of the PDV. Accordingly, the method repeatedly calculates delay-steps for subsequent packets based on one delay target value until the delay of a packet reaches that delay target value, then determines a new delay target value and determines delay-steps for subsequent packets to sequentially adjust the delay to the new delay target value. This method is repeated for all of the packets in a sample set. The method ends at step 516 when all packets in the sample set have been processed according to method steps 504-514.

In operation, the total delay of each packet may be determined (e.g., calculated) by the PDV generator 300/404 as discussed above. Exemplary total delay determinations are discussed below with respect to FIGS. 8-16.

In one or more embodiments, the PDV generator 300/404 selects a random distributed delay target value. The random distributed delay target value is determined by defining the statistical and deterministic delay components based on a specific delay profile. The delay profile may mimic a packet network condition that typically stresses the timing recovery performance of adaptive timing protocols (e.g., IEEE1588v2 interworking functions, etc.). These profiles may embody normal network conditions, stress conditions, and/or variable network conditions. Next, a simulator (e.g., PDV generator 300/404, etc.) changes the delays of the next series of packets in defined delay "steps" until the actual packet delay value is equal to the delay target value. Then, a new random delay target value is computed and the process repeats. There are two delay step processes, as discussed above and discussed in further detail below with reference to FIGS. 6 and 7. In this way, the PDV generator 300/404 may generate a complex packet delay variation profile composed of multiple simple packet delay variation profiles.

FIG. 6 depicts fixed and variable delay steps according to certain embodiments of the present invention. For variable delay steps, delay steps may be computed as a random uniformly distributed value between the minimum and maximum step sizes, $D_{stepMIN}$ and $D_{stepMAX}$, respectively. If the difference between the actual packet value and the target value is negative, then the step size value is between 0 and $D_{stepMAX}$. If the difference between the actual packet value and the target value is positive, a step size value between 0 and $D_{stepMIN}$ is used.

For fixed delay steps, delay steps may be computed to be equal to either $D_{stepMIN}$ or $D_{stepMAX}$. If the difference between the actual packet value and the target value is negative, then the step size value is set to $D_{stepMAX}$. Otherwise, the step size value is set to $D_{stepMIN}$. Delay steps are discussed in further detail with respect to U.S. patent application Ser. No. 12/074,154, entitled "Simulating Packet Delay Variation Using Step-Target Delay Method," filed Feb. 29, 2008.

Figure 7:
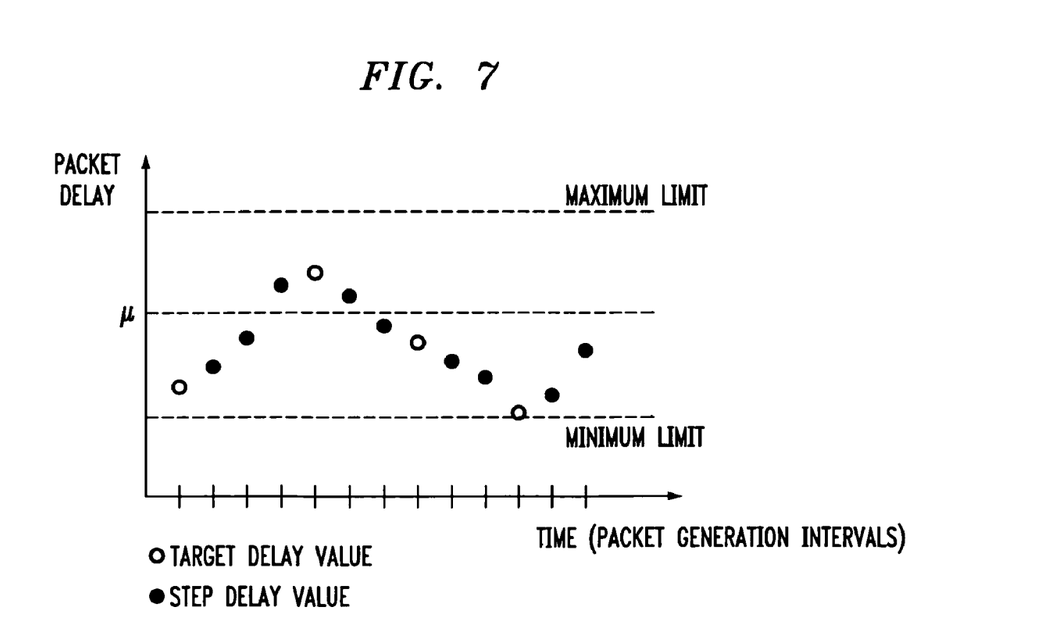
FIG. 7 depicts a graph of delay steps used to achieve a target delay value.

FIG. 7 depicts a graph of delay steps used to achieve a target delay value. After delay step values are computed, they are added at specific intervals to the current delay to simulate packet arrivals. The process of setting a target delay, applying delay steps to reach that target, and then computing a new target is depicted in FIG. 7.

FIGS. 8-17 depict various illustrations of the use of the methods and apparatus described above. Specifically, FIGS. 8, 11, 14, and 17 may also represent histograms generated based on the methods described herein. In these examples, a number (e.g., 32,000) of packet delays are measured and plotted. From these measurement plots, the distributions of various portions of the data, as in method 500 above, may be determined.

FIGS. 8-17 are examples of using the delay step method, discussed above with respect to FIG. 7 and related U.S. patent application Ser. No. 12/074,154, entitled "Simulating Packet Delay Variation Using Step-Target Delay Method," filed Feb. 29, 2008 to create a PDV target based on a combination of deterministic and statistical processes. Using this the method 500 depicted in FIG. 5, multiple deterministic and/or statistical processes that are time variant or invariant may generate a wider range of PDV than prior methods, which generally generate Gaussian distributed PDV. However, the prior methods fail to capture accurately the distributions commonly exhibited in packet switched networks, such as the long-tailed PDV of FIGS. 1 and 11-13. Further, the present invention is not limited to generating normal or typical traffic (e.g., long-tailed, etc.), but also abnormal traffic, stressed traffic, faults and/or other conditions that can be used to evaluate the timing performance of adaptive packet timing protocols.

Figure 8:
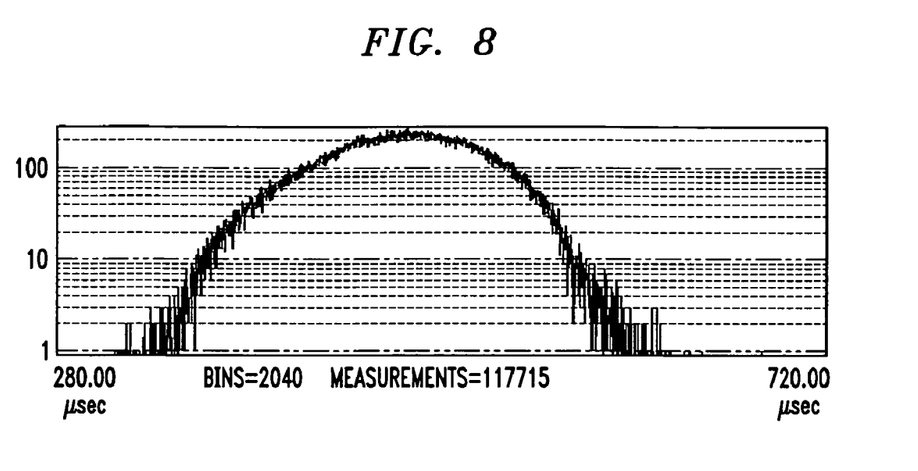
FIG. 8 depicts a histogram of measured packet delay data for an exemplary multi-switch network configuration with no background traffic.
Figure 9:
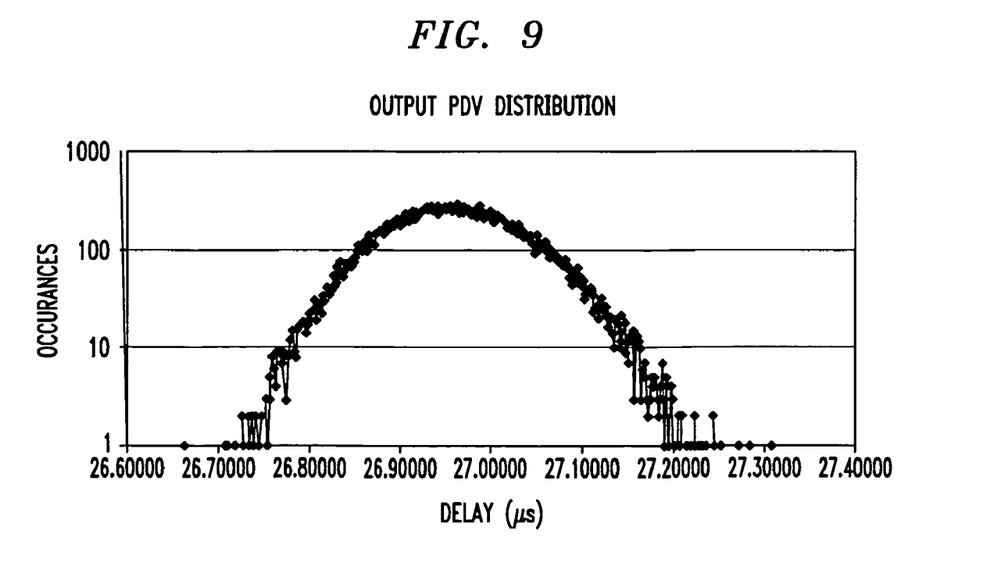
FIG. 9 is a histogram of simulated PDV for an exemplary multi-switch network configuration with no background traffic.
Figure 10:
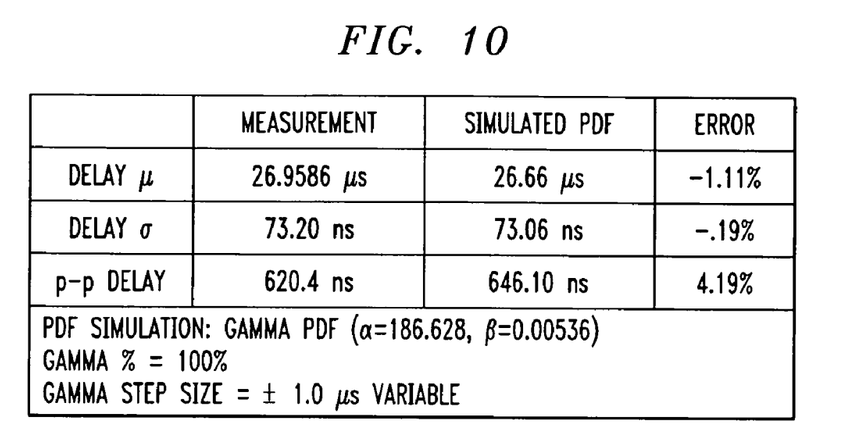
FIG. 10 is a comparison table of the measured data to the simulated data for an exemplary multi-switch network configuration with no background traffic.

FIGS. 8-10 show a comparison of measured vs. simulated PDV of a stream of packets over an exemplary multi-switch packet network configuration with no background traffic. FIG. 8 depicts a histogram of the measured packet delays from this packet network configuration. The no background traffic case appears to resemble a Gaussian-like distribution. Note that the "Y" axis is plotted on a log scale and thus does not resemble the classical "bell" curve of a linearly graphed Gaussian distribution. Though a Gaussian distribution could be used to simulate this data, it does not provide sufficient flexibility due to its symmetry. A Gamma distribution is more flexible in that it is able to generate PDF that are both symmetric and right-hand asymmetric. These changes in PDF shape are accomplished by the careful selection of the α "shape" and β "scale" parameters. More importantly, a Gamma PDF can be made to very closely resemble a Gaussian PDF.

To determine the total delay target (e.g., $D_{total}(t)$) in as in method step 504, the formula $D_{total}(t)=D_{Off}+D_p(t)$ may be expanded to $$D_{Total}(t)=D_{Off}+D_{Gamma}(U_i(t),\alpha,\beta),$$

wherein $U_i(t)$ is a random number generator between 0 and 1 at time (t). The mean and standard deviation may be determined from the measured data in FIG. 8 to provide the resultant simulated output PDV histogram shown in FIG. 9.

The packet delay histogram closely resembles the measured data plot in FIG. 8. A comparison of the exemplary measured data to the exemplary simulated data is shown in FIG. 10. Statistically, the simulated data is well within 5% of the peak-to-peak PDF value, as are the simulated values of the mean delay and standard deviation.

Figure 11:
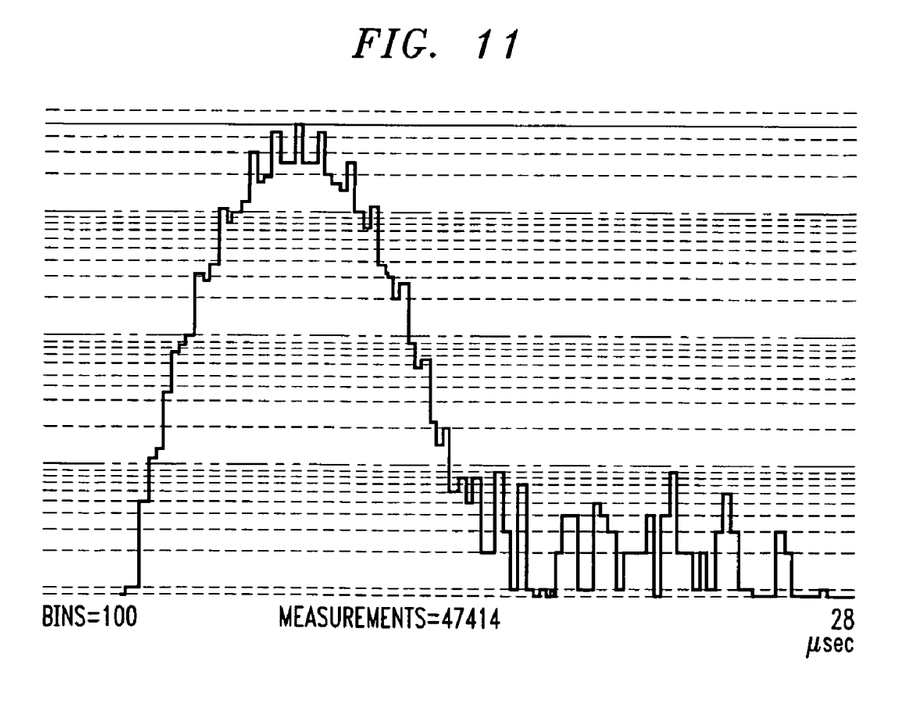
FIG. 11 depicts a histogram of measured packet delay data for an exemplary multi-switch network configuration with 5% background traffic.
Figure 12:
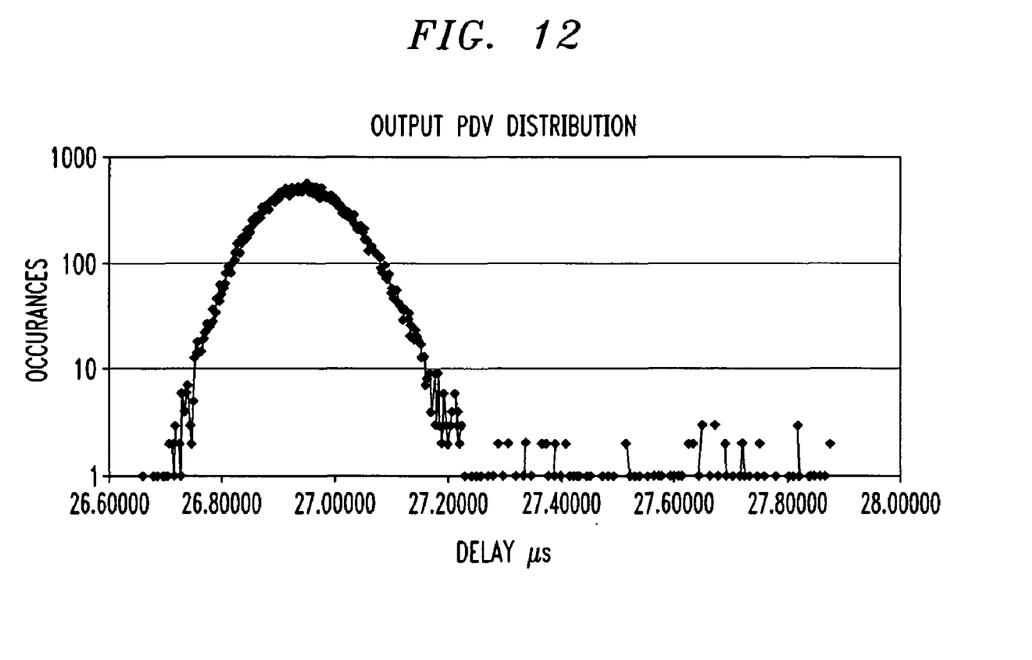
FIG. 12 is a histogram of simulated PDV for an exemplary multi-switch network configuration with 5% background traffic.
Figure 13:
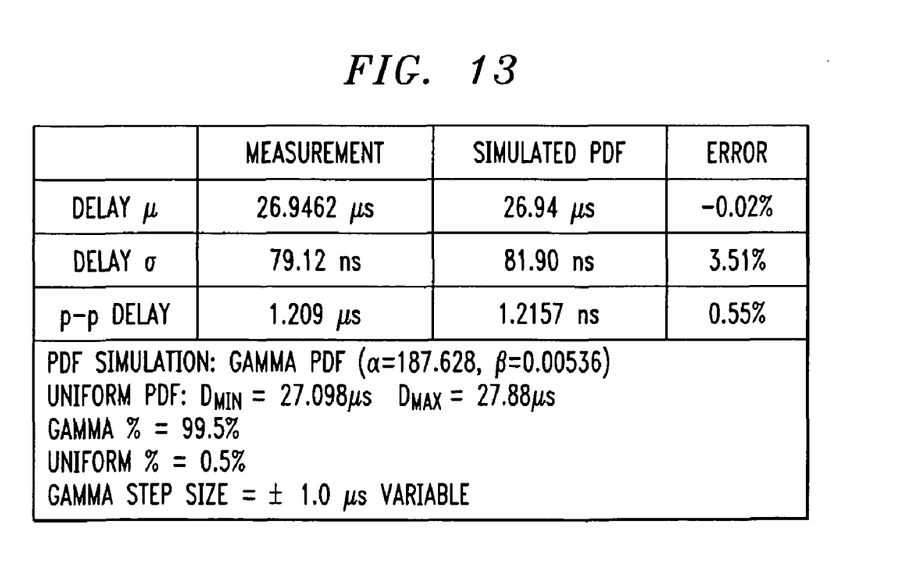
FIG. 13 is a comparison table of the measured data to the simulated data for an exemplary multi-switch network configuration with 5% background traffic.

FIGS. 11-13 show a comparison of measured vs. simulated PDV of a stream of packets over an exemplary multi-switch network configuration with 5% background traffic. Here, the overall delay distribution is composed of two PDFs, one that describes the low delay region (e.g., delay lobe) and the other describing the high delay portion (e.g., tail).

As seen by the plotted measurement data of packet delay depicted in FIG. 11, a Gamma PDF alone does not properly simulate the 5% background traffic case. Though the Gamma PDF is very adequate for modeling the low-delay lobe, it is not well suited to replicate the high delay portion of the PDF (e.g., the distribution's tail).

FIG. 11 shows a distribution tail that is relatively "uniform." Therefore, the simulation PDV model may be modified by adding a uniform PDF (e.g., for the high delay tail), along with a Gamma PDF (e.g., for the low delay lobe As shown above in FIG. 2 and the associated description, packet delays in the long-tailed region occur in bursts and typically occur on a single packet basis. In other words, they do not take multiple smaller steps to achieve their target value. Therefore, due to the singular nature of these high delay packets, a biased-delay for the high delay tail is not necessary.

Since the uniform distribution models only the "long-tail" portion of the PDF, it must represent some percentage of the total number of total number of transmitted packets. The ratio of packets distributed in the first portion (e.g., in the Gamma distribution) to the packets distributed in the second portion (e.g., in the uniform distribution) is determined.

In determining this ratio, $R_G(t)$ is the ratio of Gamma distributed packets and $R_U(t)$ is the ratio of uniform distributed packets such that $100\%=\Sigma R_G(t)+\Sigma R_U(t)$. Of course, any distributions (e.g., Gaussian, Gamma, uniform, etc.) may be used and any number of each distribution may be used to model all of the measured packet delays.

Using the ratios of the distributions, the total delay for the 5% background traffic case may be expressed as:

$$D_{Total}(t)=D_{Off}+R_G(t)[D_G(U_i(t),\alpha,\beta)]+R_U(t)[D_{min}+(D_{Max}-D_{Min})U(t)]$$

where $[D_{min}+(D_{Max}-D_{Min})U(t)]$ is the uniform distribution of the long-tail. $D_{min}$ may be the no traffic delay plus two standard deviations (e.g., $D_{min}$="no delay" $\mu+2\sigma$) and $D_{max}$ may be the maximum delay seen in the measured data. The simulated data using the total delays calculated above is seen in FIG. 12. FIG. 13 is a table showing a comparison of the measured data to the simulated data indicating the efficacy of the inventive methods.

Figure 14:
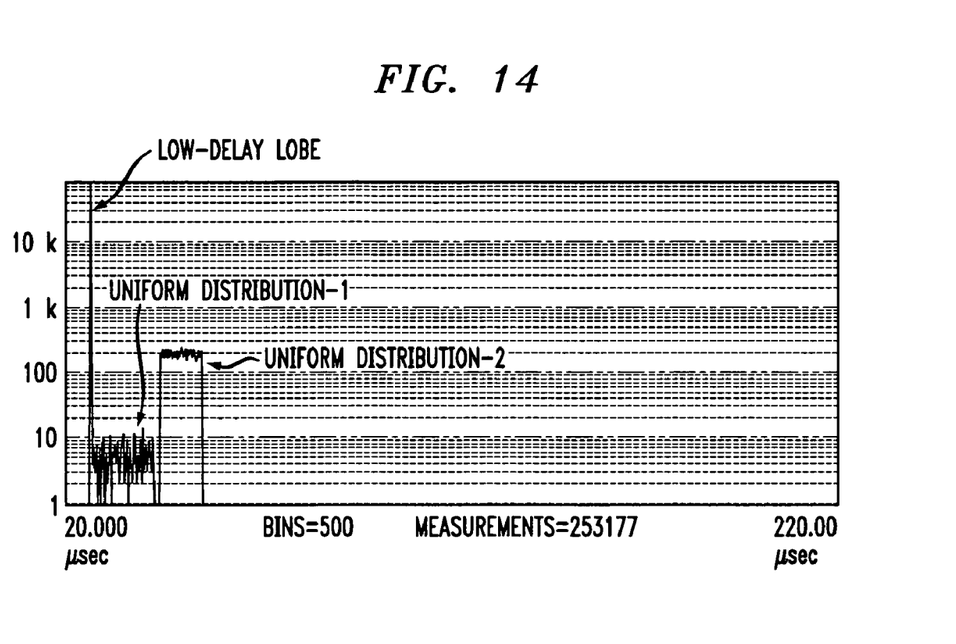
FIG. 14 depicts a histogram of measured packet delay data for an exemplary multi-switch network configuration with 10% background traffic.
Figure 15:
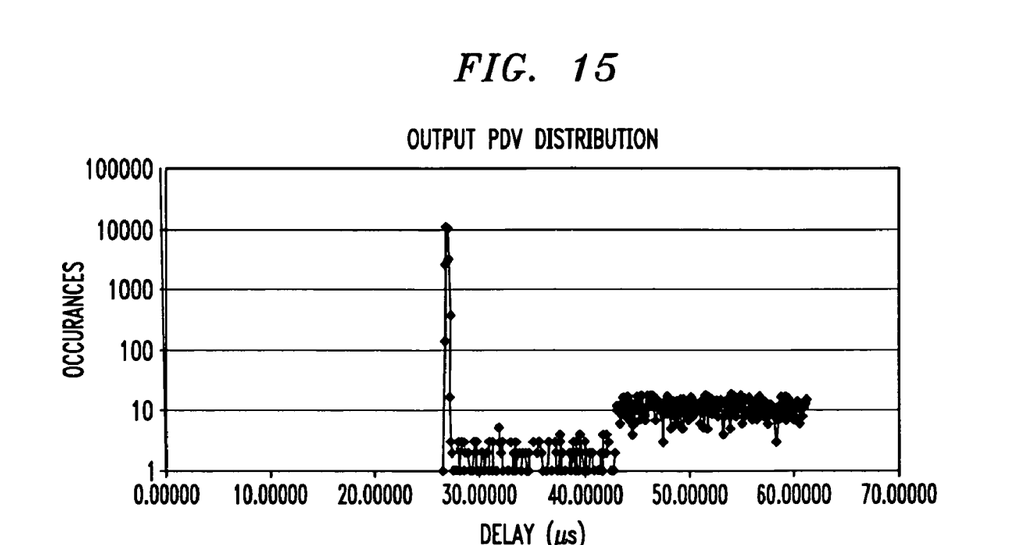
FIG. 15 is a histogram of simulated PDV for an exemplary multi-switch network configuration with 10% background traffic.
Figure 16:
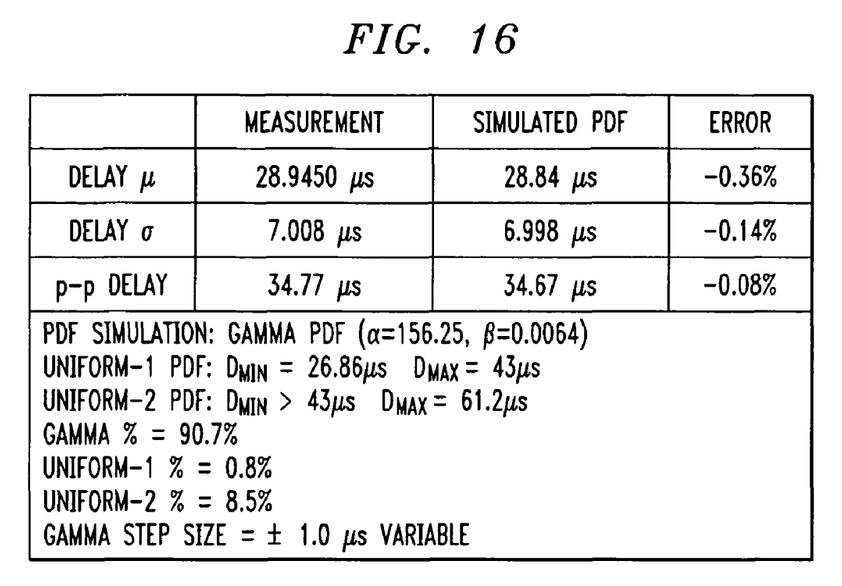
FIG. 16 is a comparison table of the measured data to the simulated data for an exemplary multi-switch network configuration with 10% background traffic.

FIGS. 14-16 show a comparison of measured vs. simulated PDV of a stream of packets over an exemplary multi-switch network configuration with 10% background traffic. Here, the overall delay distribution is composed of three PDFs, one that describes the low delay region (e.g., delay lobe), one that describes the delay just above the low delay lobe (e.g., gap), and the other describing the high delay portion (e.g., tail).

The measured delay PDF for a 10% background traffic case is shown in FIG. 14. This PDV exhibits a well-defined low-delay lobe as in the no traffic and 5% background traffic cases. However, the long tail section appears to be divided into two distributions. The distribution band with the greater delay appears to be a uniform PDF. The section between the uniform PDF and low delay lobe (e.g., gap distribution) also appears to be uniform, but with a much lower percentage of packets. To model this PDF, three separate distributions may be used—Gamma (low-delay lobe), uniform distribution-1 (gap distribution), and uniform distribution 2 (high delay band).

As in the 5% traffic case, the packet ratios of each portion must be adjusted to address the mixture of these three distributions. The ratios may be determined as $100\%=\Sigma R_G(t)+\Sigma R_{U1}(t)+\Sigma R_{U2}(t)$ where $R_{U1}(t)$ is the ratio of uniform distributed packets in the gap distribution and $R_{U2}(t)$ is the ratio of uniform distributed packets in the high delay band.

Accordingly, the total delay may be found to be:

$$D_{Total}(t)=D_{Off}+R_G(t)[D_{Gamma}(U_i(t),\alpha,\beta)]+R_{U1}(t)D_{U1}(t)+R_{U2}(t)D_{U2}(t)$$

where $D_{U1}(t)=D_{min1}+(D_{Max1}-D_{Min1})U_1(t)$ and $D_{U2}(t)=D_{min2}+(D_{Max2}-D_{Min2})U_2(t)$.

Simulation results may be seen in FIG. 15 and a comparison of the measured data to the simulation may be seen in FIG. 16. As seen here, the overall statistical results were will within 1% of the measured targets, indicating the efficacy of these methods. The simulated data output shown in FIG. 15 shows the delay contributions for each of the portions of data. The delay vs. time plot shows that high number of the high-density packets in the low-delay lobe has very little deviation. The gap distribution (e.g., between the low-delay lobe and high delay band), has far fewer packets with a random distribution. Finally, the high packet delay band shows a uniform distribution of packets with random delays. The histogram analysis of FIG. 15 also shows this same information and can be compared directly with the measured data from FIG. 14.

These methods may be extended to any network with any amount of background traffic. As in the examples shown in FIGS. 8-16, the distributions (e.g., Gamma, uniform, etc.) and the parameters of those distributions (e.g., α and β for Gamma distributions and $D_{min}$ and $D_{max}$ for uniform distributions, etc.) may be adjusted to reasonably model the measured delays in a network. In another example, FIG. 17 depicts an exemplary complex packet delay variation profile histogram of a delay PDF generated using the herein described methods.

Figure 17:
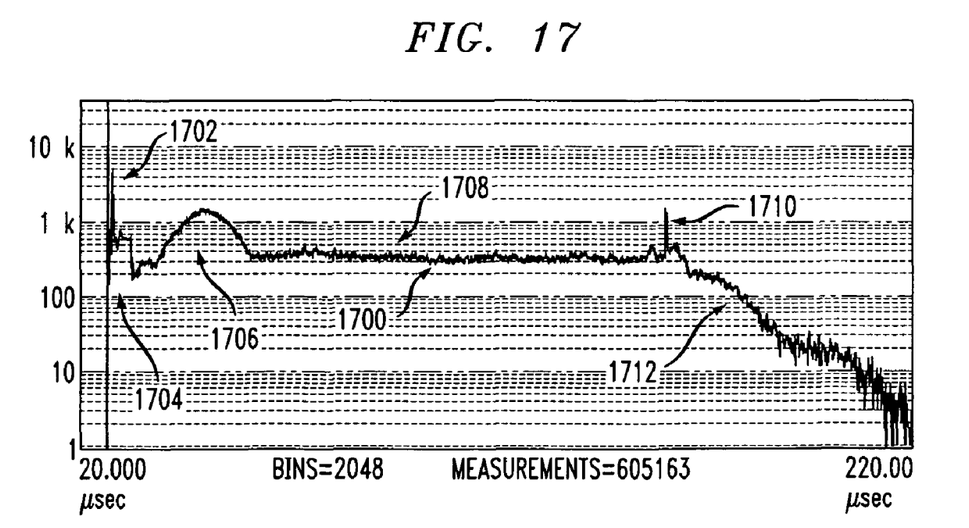
FIG. 17 shows a complex packet delay variation profile composed of multiple simple packet delay variation profiles.

FIG. 17 shows a complex packet delay variation profile 1700 composed of multiple simple packet delay variation profiles. This PDV profile 1700 is more complex than the examples shown above with respect to FIGS. 8-16, but may be generated similarly. That is, a complex packet delay variation profile may be modeled as the grouping (e.g., sum, aggregation, superposition, etc.) of several simple sub-PDFs.' Though described below as composed of certain specific distributions, FIG. 17 is exemplary of the complex distribution profile 1700 that may be modeled and/or generated using the herein described methods and is not limited to the specific distributions illustrated below.

In FIG. 17, a delay of a first portion of input data 1702 (e.g., a first plurality of packets), or even of a first packet, may have a first distribution, such as a first Gamma distribution. This may be the low-delay lobe with the highest concentration of packets. This simple sub-PDF may be modeled as in the no-traffic load case. A delay of a second portion of input data 1704 (e.g., a second plurality of packets), or even of a second packet, may have a second distribution, such as a first uniform distribution. This may a "gap distribution" and may be modeled as a uniform distribution with $D_{min}$ set to the mean delay of the first Gamma distribution+2σ. In this example, $D_{max}$ is set to a width of 6 μs. In a similar manner, simple delay variation profiles (e.g., distributions) of other portions may be determined as described above. In FIG. 17, a third portion of data 1706, packet, or plurality of packets may have a Gamma distribution. This "hump" shaped PDF may be modeled by a Gamma PDF shaped to look Gaussian. A fourth portion of data 1708, packet, or plurality of packets may be a uniform distribution. This uniform distribution may extend from $D_{max}$ of second portion 1704 to approximately 168 μs. A fifth portion of data 1710, packet, or plurality of packets may be a Gamma distribution. This distribution may be used to model the delay spike at the end of portion 1708. This Gamma distribution may be modeled similarly to the distribution for portion 1702 with a delay offset of 165 μs. Finally, a sixth portion of data 1712, packet, or plurality of packets may be a Gamma modeled as an "exponential-like" PDF.

Figure 18:
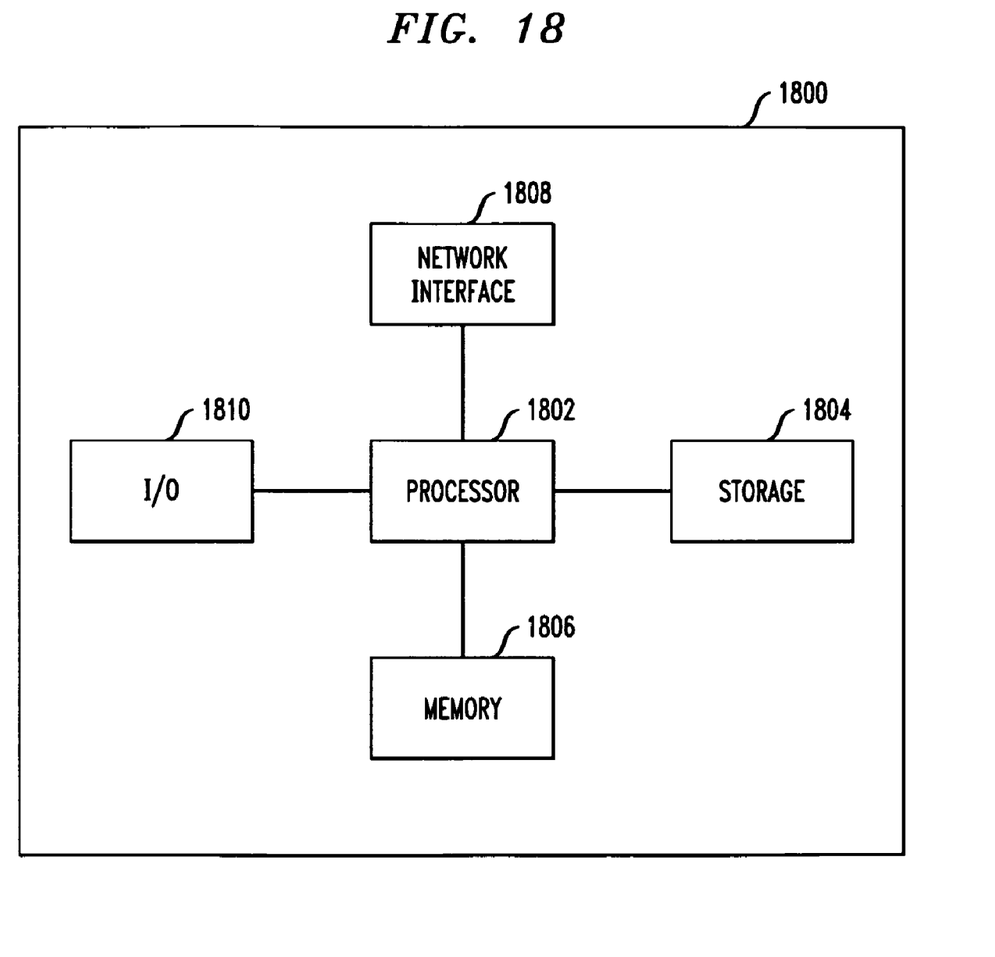
FIG. 18 is a schematic drawing of a computer according to an embodiment of the invention.

FIG. 18 is a schematic drawing of a computer 1800 according to an embodiment of the invention. The PDV generator 300/404 of FIGS. 3 and 4 as well as the packet simulation system 400 may be implemented on various components of computer 1800 as appropriate. Computer 1800 contains a processor 1802 that controls the overall operation of the computer 1800 by executing computer program instructions that define such operation. The computer program instructions may be stored in a non-transitory machine readable storage medium 1804 (e.g., magnetic disk, database, etc.) and loaded into memory 1806 when execution of the computer program instructions is desired. Thus, applications for performing the herein-described method steps, such as determining a total delay and simulating and/or modeling a network and/or packet delays, are defined by the computer program instructions stored in the memory 1806 and/or storage 1804 and controlled by the processor 1802 executing the computer program instructions. The computer 1800 also includes one or more network interfaces 1808 for communicating with other devices via a network. The computer 1800 also includes other input/output devices 1810 (e.g., display, keyboard, mouse, speakers, buttons, etc.) that enable user interaction with the computer 1800. One skilled in the art will recognize that an implementation of an actual computer could contain other components as well, and that the computer of FIG. 18 is a high-level representation of some of the components of such a controller for illustrative purposes.

Further, the computer 1800 may be implemented on, may be coupled to, and/or may include any components or devices that are typically used by, or used in connection with, a computer or computer system. Computer 1800 and/or processor 1802 may include one or more central processing units, read only memory (ROM) devices and/or random access memory (RAM) devices.

According to some embodiments of the present invention, instructions of a program (e.g., controller software) may be read into memory 1806, such as from a ROM device to a RAM device or from a LAN adapter to a RAM device. Execution of sequences of the instructions in the program may cause the computer 1800 to perform one or more of the method steps described herein: In alternative embodiments, hard-wired circuitry, logic, or integrated circuits may be used in place of, or in combination with, software instructions for implementation of the processes of the present invention. Thus, embodiments of the present invention are not limited to any specific combination of hardware, firmware, and/or software. The memory 1806 may store the software for the computer 1800, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A packet delay variation simulation system comprising:
a packet generator configured to generate a plurality of signals indicative of packets;
a packet delay variation generator configured to receive the signals from the packet generator and delay the signals;
a packet delay analyzer configured to receive the delayed signals from the packet delay variation generator and signals from the packet generator and generate a profile of the delayed signals, thereby constructing a total delay model for a multi-switch network,
wherein the packet delay variation generator comprises one or more packet delay distribution modules each comprising:
a deterministic delay process packet delay input; and
a statistical delay process packet delay input;
wherein the one or more packet delay variation generators are configured to determine a packet delay distribution for the signals;
a packet delay distribution compiler configured to determine a total packet delay variation based on the packet delay distributions determined at the one or more packet delay distribution modules; and a packet delay scheduler configured to receive the total packet delay variation from the packet delay distribution compiler and signals from the packet generator and determine a probability density function profile of the signals.

2. The system of claim 1 wherein the packet delay analyzer is configured to generate a histogram of the delayed signals.

3. A method of modeling, by a simulation system, packet delay variation of packets to construct a total delay model for a multi-switch network comprising:
determining a delay offset of a first packet;
determining, by at least one packet delay distribution module, a delay distribution of the first packet;
calculating, by a packet delay distribution compiler, a total delay of the first packet based at least in part on the delay offset and a delay based on the distribution of the first packet;
determining, by the at least one packet delay distribution module, a delay distribution of a second packet, the delay distribution of the second packet different from the delay distribution of the first packet;
calculating, by the packet delay distribution compiler, the total delay of the second packet based at least in part on the delay offset and a delay based on the distribution of the second packet; and
determining, by a packet delay scheduler, a complex packet delay variation profile by:
determining a total delay of a first plurality of packets based at least in part on the delay offset and the delay based on the distribution of the first packet; and
determining a total delay of a second plurality of packets based at least in part on the delay offset and the delays based on the distribution of the second packet, thereby constructing the total delay model for the multi-switch network.

4. The method of claim 3 wherein determining a complex packet delay variation profile further comprises:
determining a ratio of the first plurality of packets to the second plurality of packets; and
determining a statistical delay based on the ratio of the first plurality of packets to the second plurality of packets and the distributions of the first and second pluralities of packets.

5. The method of claim 4 wherein:
the distribution of the first plurality of packets is a Gamma distribution;
the distribution of the second plurality of packets is a uniform distribution;
determining the ratio of the first plurality of packets to the second plurality of packets comprises determining the equation $100\% = \Sigma R_G(t) + \Sigma R_U(t)$ wherein $R_G(t)$ is the ratio of Gamma distributed packets and $R_U(t)$ is the ratio of uniformed distributed packets; and
the total delay is calculated as $$D_{total}(t) = D_{Off} + R_G(t)[D_G(U(t),\alpha,\beta)] + R_U(t)[D_{min} + (D_{Max} - D_{Min})U(t)]$$

wherein:
$D_G(U_i(t),\alpha,\beta)$ is the Gamma distribution of the first plurality of packets;
$\alpha$ is the shape parameter and $\beta$ is the scale parameter of the Gamma distribution;
$U(t)$ is a random number generator between 0 and 1 at time (t);
$[D_{min} + (D_{Max} - D_{Min})U(t)]$ is the uniform distribution of the second plurality of packets;

$D_{min}$ is the sum of a no traffic delay and two standard deviations of the distribution of the second plurality of packets; and
$D_{max}$ is the maximum delay in the second plurality of packets.

6. The method of claim 3 further comprising:
applying a delay value to the first packet based on the calculated total delay of the first packet; and
applying a delay value to the second packet based on the calculated total delay of the second packet.

7. The method of claim 6 wherein applying the delay values based on the calculated total delays comprises:
delaying the first and second packets using a fixed delay step.

8. The method of claim 6 wherein applying the delay values based on the calculated total delays comprises:
delaying the first and second packets using a variable delay step.

9. The method of claim 3 wherein:
calculating the total delay of the first packet comprises:
determining $D_{total1}(t) = D_{Off} + D_{p1}(t)$ wherein $D_{p1}(t)$ is the packet delay due to the distribution of the first packet, $D_{Off}$ is the delay offset, and $D_{total1}(t)$ is the total delay experienced by the first packet; and
calculating the total delay of the second packet comprises:
determining $D_{total2}(t) = D_{Off} + D_{p2}(t)$ wherein $D_{p2}(t)$ is the packet delay due to the distribution of the second packet, $D_{Off}$ is the delay offset, and $D_{total2}(t)$ is the total delay experienced by the second packet.

10. The method of claim 9 wherein:
the distribution of the first packet is a Gamma distribution; $D_p(t) = D_{Gamma}(U(t),\alpha,\beta)$ wherein:
$\alpha$ is the shape parameter and $\beta$ is the scale parameter of a Gamma distribution;
$U(t)$ is a random number generator between 0 and 1 at time (t); and
calculating a total delay of the first packet based at least in part on the delay based on the distribution of the first packet further comprises:
determining the $\alpha$ shape and $\beta$ scale parameters; and
calculating a delay $D_p(t)$ of the first packet based on the Gamma distribution delay.

11. The method of claim 9 wherein the distribution of the second packet is a user-defined distribution.

12. A non-transitory machine readable medium having program instructions stored thereon, wherein, when the instructions are executed by a processor, the processor implements a method of modeling packet delay variation of packets to construct a total delay model for a multi-switch network, the method comprising:
determining a delay offset of a first packet;
determining a delay distribution of the first packet;
calculating a total delay of the first packet based at least in part on the delay offset and a delay based on the distribution of the first packet;
determining a delay distribution of a second packet, the delay distribution of the second packet different from the delay distribution of the first packet;
calculating the total delay of the second packet based at least in part on the delay offset and a delay based on the distribution of the second packet; and
determining a complex packet delay variation profile by:
determining a total delay of a first plurality of packets based at least in part on the delay offset and the delay based on the distribution of the first packet; and
determining a total delay of a second plurality of packets based at least in part on the delay offset and the delays based on the distribution of the second packet, thereby constructing the total delay model for the multi-switch network.

13. The non-transitory machine readable medium of claim 12 wherein determining a complex packet delay variation profile further comprises:
   determining a ratio of the first plurality of packets to the second plurality of packets; and
   determining a statistical delay based on the ratio of the first plurality of packets to the second plurality of packets and the distributions of the first and second pluralities of packets.

14. The non-transitory machine readable medium of claim 12 further comprising:
   applying a delay value to the first packet based on the calculated total delay of the first packet; and
   applying a delay value to the second packet based on the calculated total delay of the second packet.

15. The non-transitory machine readable medium of claim 14 wherein applying the delay values based on the calculated total delays further comprises:
   delaying the first and second packets using a fixed delay step.

16. The non-transitory machine readable medium of claim 14 wherein applying the delay values based on the calculated total delays further comprises:
   delaying the first and second packets using a variable delay step.

17. The non-transitory machine readable medium of claim 12 wherein:
   calculating the total delay of the first packet further comprises:
      determining $D_{total1}(t)=D_{Off}+D_{p1}(t)$ wherein $D_{p1}(t)$ is the packet delay due to the distribution of the first packet, $D_{Off}$ is the delay offset, and $D_{total1}(t)$ is the total delay experienced by the first packet; and
   calculating the total delay of the second packet further comprises:
      determining $D_{total1}(t)=D_{Off}+D_{p1}(t)$ wherein $D_{p1}(t)$ is the packet delay due to the distribution of the second packet, $D_{Off}$ is the delay offset, and $D_{total1}(t)$ is the total delay experienced by the second packet.

18. The non-transitory machine readable medium of claim 17 further comprising using a user-defined distribution as the distribution of the first packet and the second packet.

* * * * *